United States Patent Office 3,682,680
Patented Aug. 8, 1972

3,682,680
CLAY-COATED SHEET FOR PRESSURE-SENSITIVE COPYING SHEET
Takao Hayashi and Hiroharu Matsukawa, Shizuoka, Japan, assignors to Fuji Photo Film Co., Ltd., Kanagawa, Japan
No Drawing. Filed May 12, 1970, Ser. No. 36,667
Claims priority, application Japan, May 12, 1969, 44/36,405
Int. Cl. B41m 5/16
U.S. Cl. 117—36.2    8 Claims

ABSTRACT OF THE DISCLOSURE

A clay-coated sheet for use in a pressure-sensitive copying sheet comprising a support having coated thereon a clay layer containing an alkali metal salt of an organic acid.

BACKGROUND OF THE INVENTION

Field of the invention

This invention relates to a clay-coated sheet for pressure-sensitive copying sheet. More specifically, it pertains to a clay-coated sheet for use in pressure-sensitive copying paper, wherein undesirable color changes (yellowing) and the lowering of activity prior to use are prevented by incorporating an organic acid salt into the clay-coated layer thereof.

Description of the prior art

Ordinary pressure-sensitive copying sheets are based on the principle of the color forming reaction between an electron-donating colorless compound and an electron-accepting solid acid when contacted with each other.

Various types of pressure sensitive copying sheets are known; e.g., those described in U.S. Pats. Nos. 2,712,507, 2,703,456 and 2,730,457; for example, (1) a combination of an upper sheet having a layer of microcapsules containing an electron donating colorless compound (hereinafter referred to as a "color former") and an upper sheet having a layer of an electron-accepting solid acid (hereinafter referred to as a "clay"); (2) a combination of an upper sheet, an intermediate sheet one surface of which is coated with the microcapsules and the other surface with clay and an under sheet; and (3) a single sheet having coated on the same surface both the microcapsules and the clay.

The electron donating colorless compounds used for the preparation of color former sheets include various leuco type dyestuffs such as crystal violet alactone, leucomethylene blue, rhodamine B lactone and michler hydrol, etc.

Electron-accepting solid acids used for the preparation of clay sheets include clays such as attapulgite, acid clay or active clay. The clays are coated, together with binders such as starch, casin, latex, etc., on the surface of the paper to give the clay-coated sheet. The clay-coated sheet is then treated to promote the surface activity of the clay layer, but the thus-activated surface makes the layer fragile to a staining substance, and also reduces the color-forming activity of the layer with the color former. For example, when a number of clay-coated sheets are stacked one upon the other and allowed to stand, that part of the sheets exposed to air would be stained with the lapse of time, and would therefore lose their commercial value as a copying sheet.

An object of this invention is to provide a pressure-sensitive copying sheet which is not stained when exposed to air, but is able to form excellent color.

Heretofore, several processes have been proposed for this purpose. For example, it is described in Japanese patent publication No. 2,013/67 that the reaction product of attapulgite with a water soluble metal salt such as a salt of zinc, cadmium, mercury, calcium, manganese, strontium, magnesium, cobalt or nickel, in the form of a slurry, may be used as a coating composition for the production of a clay-coated sheet. In this case, since the divalent metal salt would react with the binder during the preparation of the coating composition, or would reduce the stability of the slurry, the slurry is apt to be more viscous or to be coagulated. Especially in cases when styrenebutadiene latex, acrylic acid-styrene latex, acrylbutadiene latex, or casein is used as the binder, the binder would be coagulated by the presence of the divalent metal salt. Therefore, the amount of the divalent metal salt which may be used is restricted within a definite range.

Another object of this invention is to provide a more stable clay-coating composition for pressure-sensitive copying than has heretofore been known.

SUMMARY OF THE INVENTION

The objects of the present invention can be achieved by incorporating an alkali metal salt of an organic acid into the clay layer of the clay-coated sheet used for a pressure-sensitive copying sheet.

DETAILED DESCRIPTION OF THE PREFERRED EMBODIMENTS

The alkali metal salts which may be used in this invention include alkali metal salts of mono-basic acids, di-basic acids and poly-basic acids. Illustrative salts are: the lithium, sodium or potassium salt of formic acid, acetic acid, propionic acid, butyric acid, halogenated acetic acid including monochloro acetic acid, and dichloroacetic acid; acrylic acid, vinyl acetic acid, phenyl acetic acid, benzoic acid, benzene sulfonic acid, p-toluene sulfonic acid, oxalic acid, malonic acid, succinic acid, glutaric acid, adipic acid, oxalacetic acid, maleic acid, fumalic acid, tartaric acid, and citric acid. Among these acid salts, formic acid salts are the most effective. It is generally preferred to use the organic acid salt in an amount greater than 0.01 mole per 100 g. of the clay. The clay-coated sheet for use in pressure-sensitive copying sheets of this invention may be prepared by conventional methods used in the production of conventional clay-coated sheets. There is no special procedure required for the incorporation of the salt into the clay.

The clay-coated sheet of this invention provides for a excellent color forming reaction, regardless of the kind of color former used, and the clay-coated sheet is able to be exposed to air for long periods of time without staining.

The following examples illustrate the present invention in more detail, but the scope of this invention is not intended to be limited to the examples.

EXAMPLE 1

Into 250 cc. of water, 5 g. of sodium formate was dissolved and 100 g. of acid clay was added with stirring into the solution. After the slurry was well dispersed, the stirring speed was slowed down, and 40 g. of a 10% aqueous casein solution and 30 g. of styrene-butadiene rubber latex (Dow 636: product of Dow Chemical Co.) were incorporated into the slurry to prepare the coating composition. Finally, into the slurry, 10 g. of a 20% aqueous sodium hydroxide solution was added to adjust the pH of the dispersion to 10.1.

The dispersion so prepared was coated on a paper in an amount of 8.5 g./m.$^2$, and the paper was dried.

The clay-coated sheet thus obtained was allowed to stand in a room for 6 weeks and the whiteness of the clay-coated sheet was determined using a Hunter whiteness colorimeter. The results obtained were as follows:

| Clay and additive | Whiteness at— | |
|---|---|---|
| | Immediately after coating | After 6 weeks |
| Acid clay (only) | 82 | 61 |
| Acid clay and sodium formate | 81.6 | 72 |

As shown in the above table, the whiteness decrease of the clay-coated sheet of this invention is remarkably improved. The clay-coated sheet thus prepared was contacted with the color former sheet described in U.S. Pats. Nos. 2,730,456 or 2,730,457 and pressure was locally applied on the contacted sheets. A clear copy was instantly formed.

EXAMPLE 2

The same procedure as in Example 1 was repeated but using sodium acetate in place of sodium formate. The results obtained were as follows:

| Clay and additive | Whiteness at— | |
|---|---|---|
| | Immediately after coating | After 6 weeks |
| Clay (only) | 82 | 61 |
| Clay and sodium acetate | 81.7 | 67 |

EXAMPLE 3

The same procedure as in Example 1 was repeated but using potassium formate in place of sodium formate. The results obtained were as follows:

| Clay and additive | Whiteness at— | |
|---|---|---|
| | Immediately after coating | After 6 weeks |
| Clay (only) | 82 | 63 |
| Clay and potassium formate | 82 | 74 |

EXAMPLE 4

The same procedure as in Example 1 was repeated but using acryl-butadiene-latex (Polylac 520: product of Mitsui Toatsu K.K.) instead of styrene-butadiene latex. The results obtained were as follows:

| Clay and additive | Whiteness at— | |
|---|---|---|
| | Immediately after coating | After 6 weeks |
| Clay (only) | 83 | 64 |
| Clay and sodium formate | 82.8 | 76 |

The upper limit of the amount of the organic acid salt to be added to the clay layer is 1 mole per 100 g. of clay.

What is claimed is:

1. A clay-coated sheet for use in a pressure-sensitive copying sheet comprising a support having coated thereon a layer of clay selected from the group consisting of acid clay, active clay and attapulgite, said layer containing 0.01 to 1 mole of an alkali metal salt of an organic mono- or di-basic acid per 100 g. of clay, and a binder which is normally coagulated by a divalent metal salt.

2. The clay-coated sheet as in claim 1 wherein said alkali metal salt is an alkali metal salt of a monobasic acid.

3. The clay-coated sheet as in claim 2 wherein said alkali metal salt of said monobasic acid is a member selected from the group consisting of lithium formate, sodium formate, potassium formate, lithium acetate, sodium acetate, potassium acetate, lithium propionate, sodium propionate, potassium propionate, lithium butylate, sodium butylate, potassium butylate, lithium monochloroacetate, sodium monochloroacetate, potassium monochloroacetate, lithium dichloroacetate, sodium dichloroacetate and potassium dichloroacetate.

4. The clay-coated sheet as in claim 1 wherein said alkali metal salt is an alkali metal salt of a dibasic acid.

5. The clay-coated sheet as in claim 4 wherein said alkali metal salt of said dibasic acid is a member selected from the group consisting of lithium oxalate, sodium oxalate, potassium oxalate, lithium malonate, sodium malonate, potassium malonate, lithium succinate, sodium succinate, potassium succinate, lithium glutarate, sodium glutarate, potassium glutarate, lithium adipate, sodium adipate, potassium adipate, lithium maleate, sodium maleate, potassium maleate, lithium fumarate, sodium fumarate, potassium fumarate, lithium tartarate, sodium tartarate and potassium tartarate.

6. A clay-coated sheet for use in a pressure-sensitive copying sheet comprising a base paper having coated thereon a layer containing a clay, a binder and an organic acid salt selected from the group consisting of lithium formate, sodium formate and potassium formate.

7. A pressure-sensitive copying paper comprising a base paper having coated thereon a layer containing microcapsules in which colorless color former is contained, a binder which is normally coagulated by a divalent metal salt, clay and an alkali metal salt of a mono- or di-basic organic acid, said clay being contacted with said colorless color former to produce a distinct color.

8. A pressure-sensitive copying sheet comprising a base paper having coated thereon a layer of microcapsules in which a colorless color former is contained, a binder which is normally coagulated by a divalent metal salt, and a layer of clay containing an alkali metal salt of a mono- or di-basic organic acid, said clay being contacted with said colorless color former to produce a distinct color.

References Cited
UNITED STATES PATENTS

| 2,972,547 | 2/1961 | Tien | 117—36.2 |
| 3,516,845 | 6/1970 | Brockett | 117—36.2 |
| 3,540,911 | 11/1970 | Lin | 117—36.2 |
| 3,293,060 | 12/1966 | Harbort | 117—36.2 |
| 3,330,722 | 7/1967 | Amano et al. | 117—36.2 |
| 2,981,738 | 4/1961 | Kranz | 117—36.2 |
| 3,525,630 | 8/1970 | Phillips | 117—36.2 |

MURRAY KATZ, Primary Examiner

U.S. Cl. X.R.

117—155 UA, 156